US012628048B2

(12) United States Patent　　　　　(10) Patent No.:　US 12,628,048 B2
Vasamsetti et al.　　　　　　　　　　(45) Date of Patent:　May 12, 2026

(54) SYSTEMS AND METHODS FOR PROVIDING NETWORK SLICE QUALITY OF SERVICE MODIFICATIONS IN REAL TIME

(71) Applicant: Verizon Patent and Licensing Inc., Basking Ridge, NJ (US)

(72) Inventors: Satish S. Vasamsetti, San Francisco, CA (US); Emerando M. Delos Reyes, Pleasant Hill, CA (US); Jerry Steben, Fort Worth, TX (US); Tony Ferreira, Greenwich, CT (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 228 days.

(21) Appl. No.: 18/491,510

(22) Filed: Oct. 20, 2023

(65) Prior Publication Data

US 2025/0133447 A1　　Apr. 24, 2025

(51) Int. Cl.
*H04W 28/24*　　　(2009.01)
*H04W 28/02*　　　(2009.01)

(52) U.S. Cl.
CPC ....... *H04W 28/24* (2013.01); *H04W 28/0289* (2013.01)

(58) Field of Classification Search
CPC ............. H04W 28/24; H04W 28/0289; H04W 28/0268
See application file for complete search history.

(56) References Cited

U.S. PATENT DOCUMENTS

| 2020/0029242 A1* | 1/2020 | Andrews | ............. H04W 72/543 |
|---|---|---|---|
| 2020/0359269 A1* | 11/2020 | Qiao | ................... H04L 12/1407 |
| 2021/0112436 A1* | 4/2021 | Hoffner | .............. H04L 41/5025 |
| 2022/0200866 A1* | 6/2022 | Holmström | ........... H04W 28/24 |
| 2022/0272620 A1* | 8/2022 | Ninglekhu | ............ H04W 40/02 |
| 2023/0049321 A1* | 2/2023 | Gundavelli | ........... H04W 48/18 |
| 2024/0129198 A1* | 4/2024 | Bogineni | .............. H04L 41/122 |
| 2024/0305533 A1* | 9/2024 | Bai | ........................ H04W 24/02 |
| 2025/0119795 A1* | 4/2025 | Pathania | ............. H04W 72/543 |

* cited by examiner

*Primary Examiner* — Phuoc H Nguyen
*Assistant Examiner* — Steven C Nguyen

(57) ABSTRACT

A network device may receive, from a user device, a request for data associated with network slices provided to a region or a network, and may provide, to the user device, network slice data, quality of service (QoS) levels, and a policy lookup table based on the request. The network device may receive, from the user device, priority data identifying a network slice for prioritization, a duration of the prioritization, and a policy for the prioritization, and may create, based on the priority data, a QoS policy table that includes a QoS level for the network slice. The network device may cause network functions to utilize the QoS policy table for a user equipment.

20 Claims, 9 Drawing Sheets

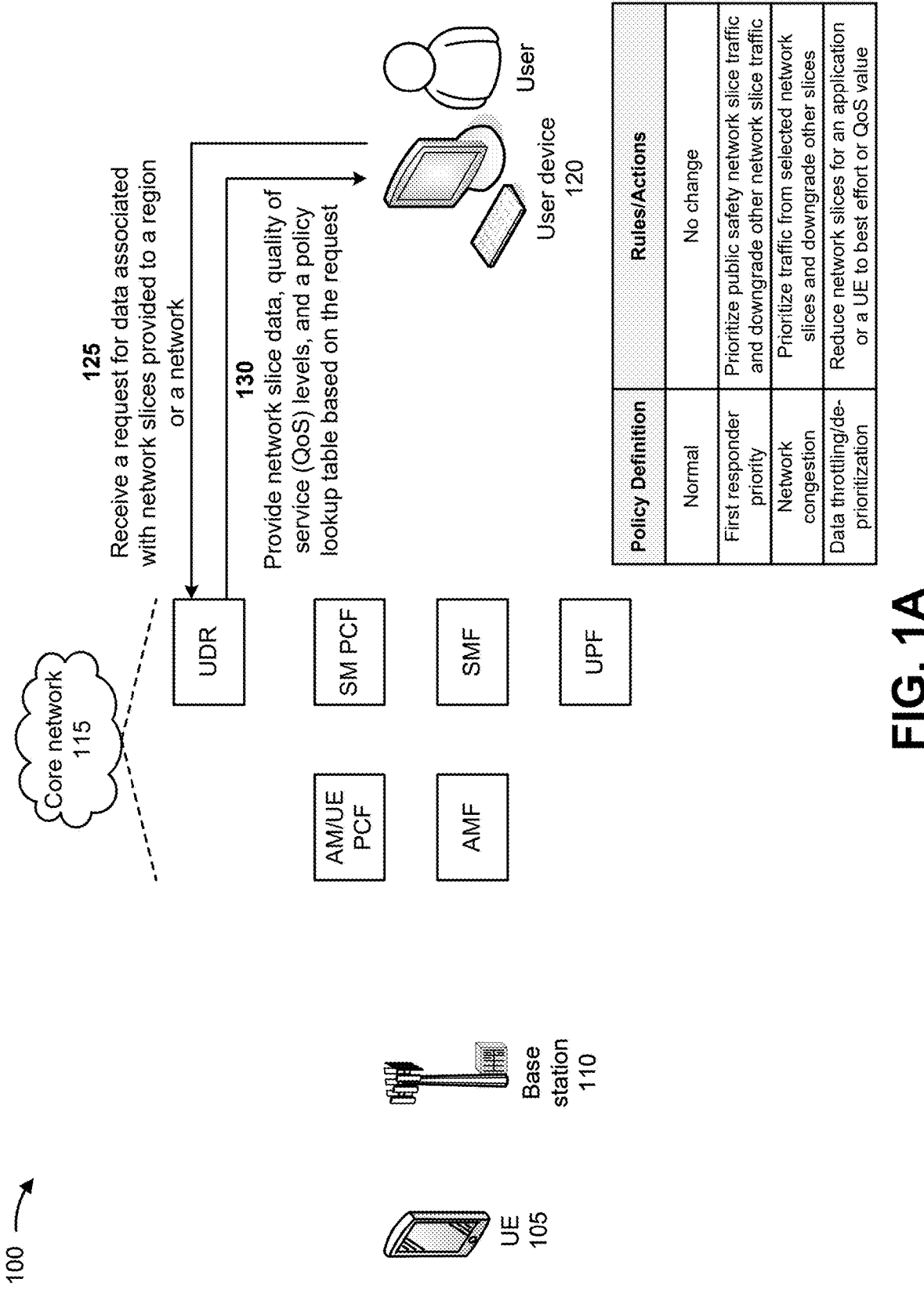

125
Receive a request for data associated with network slices provided to a region or a network

130
Provide network slice data, quality of service (QoS) levels, and a policy lookup table based on the request User User device 120

Core network 115

UDR

SM PCF

SMF

UPF

AM/UE PCF

AMF

Base station 110

UE 105

100

| Policy Definition | Rules/Actions |
|---|---|
| Normal | No change |
| First responder priority | Prioritize public safety network slice traffic and downgrade other network slice traffic |
| Network congestion | Prioritize traffic from selected network slices and downgrade other slices |
| Data throttling/de-prioritization | Reduce network slices for an application or a UE to best effort or QoS value |

FIG. 1A

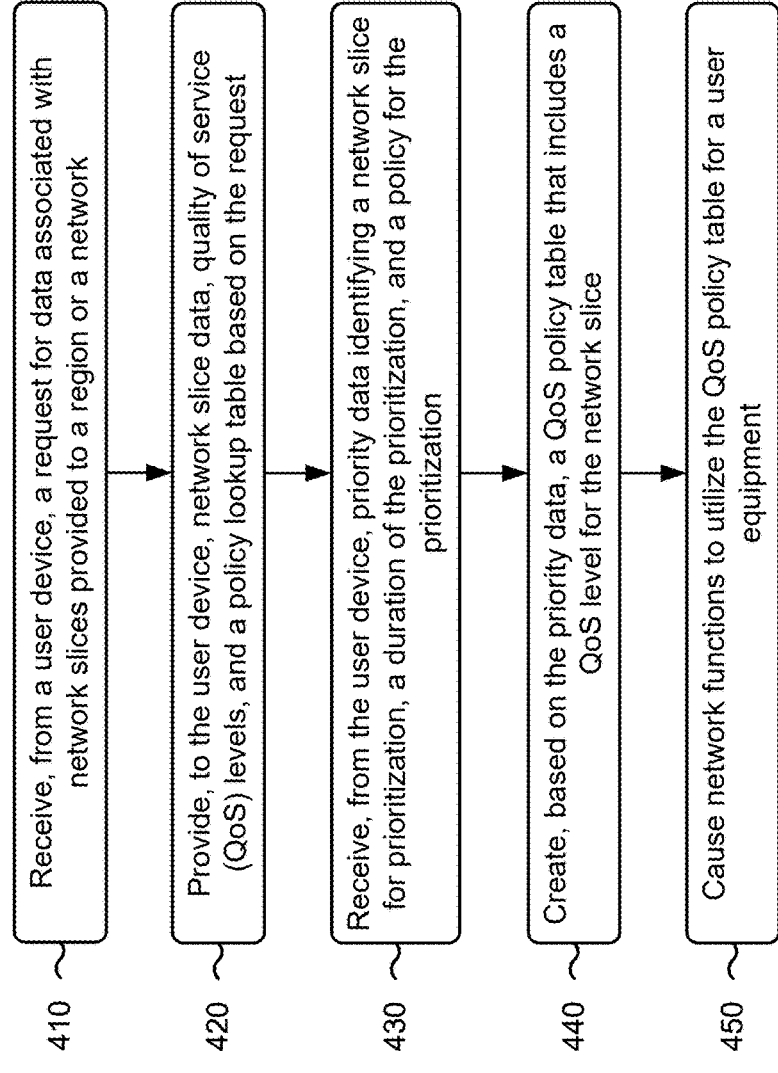

400

410   Receive, from a user device, a request for data associated with network slices provided to a region or a network 420   Provide, to the user device, network slice data, quality of service (QoS) levels, and a policy lookup table based on the request 430   Receive, from the user device, priority data identifying a network slice for prioritization, a duration of the prioritization, and a policy for the prioritization 440   Create, based on the priority data, a QoS policy table that includes a QoS level for the network slice 450   Cause network functions to utilize the QoS policy table for a user equipment

FIG. 4

SYSTEMS AND METHODS FOR PROVIDING NETWORK SLICE QUALITY OF SERVICE MODIFICATIONS IN REAL TIME

BACKGROUND

A network slice is a logical partition of a physical network that provides customized services and resources to different types of users and applications. In fifth generation (5G) networks, network slicing enables creation of multiple virtual networks on top of a common infrastructure, where each network slice may include different performance, security, and reliability requirements.

BRIEF DESCRIPTION OF THE DRAWINGS

FIGS. 1A-1F are diagrams of an example associated with providing network slice quality of service (QoS) modifications in real time.

FIG. 4 is a flowchart of an example process for providing network slice QoS modifications in real time.

DETAILED DESCRIPTION OF EXAMPLE EMBODIMENTS

Figure 1B:
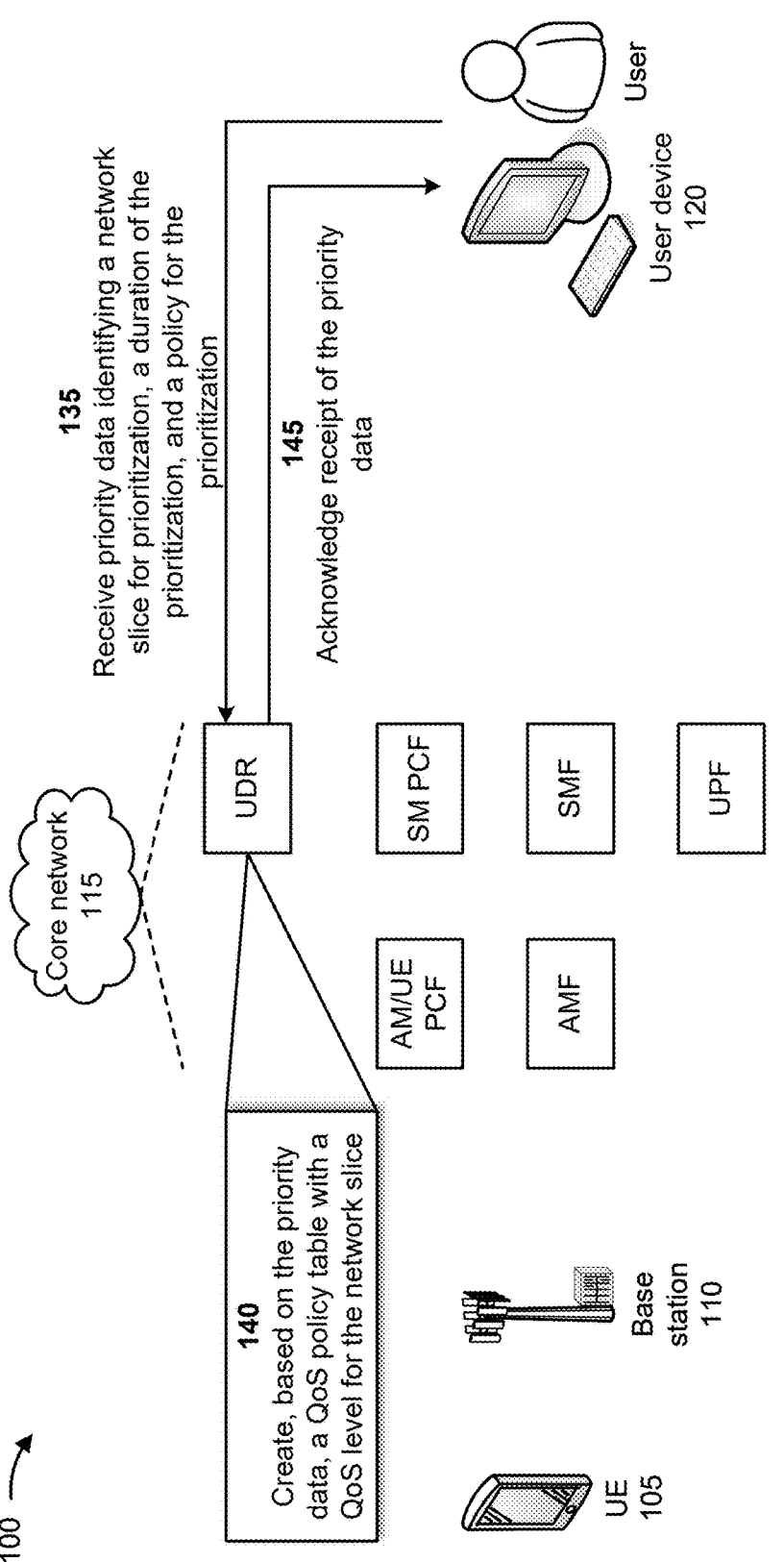

The following detailed description of example implementations refers to the accompanying drawings. The same reference numbers in different drawings may identify the same or similar elements.

Network slicing enables fifth generation (5G) networks to support diverse use cases such as enhanced mobile broadband (eMBB), ultra-reliable low-latency communication (URLLC), massive machine-type communication (mMTC), public safety handling mission critical applications, and/or the like. Thus, network slicing enables virtual end-to-end networks tailored to applications. Network slices may be pre-configured as basic or customized to meet customers' specific application needs and characteristics. However, once a network slice is created and deployed, an assigned network slice quality of service (QoS) cannot be modified by a 5G service provider (e.g., a network operator). Thus, current techniques for utilizing network slices consume computing resources (e.g., processing resources, memory resources, communication resources, and/or the like), networking resources, and/or other resources associated with failing to enable a QoS of network slice to be modified after deployment, failing to provide adequate services via a network slice due being unable to modify the QoS of the network slice, providing a poor user experience for users of a network slice that would benefit from a QoS modification, and/or the like.

Some implementations described herein provide a network device (e.g., a unified data repository (UDR)) that provides network slice QoS modifications in real time. For example, the UDR may receive, from a user device, a request for data associated with network slices provided to a region or a network, and may provide, to the user device, network slice data, QoS levels, and a policy lookup table based on the request. The UDR may receive, from the user device, priority data identifying a network slice for prioritization, a duration of the prioritization, and a policy for the prioritization, and may create, based on the priority data, a QoS policy table that includes a QoS level for the network slice. The UDR may cause network functions to utilize the QoS policy table for a user equipment (UE).

In this way, the UDR provides network slice QoS modifications in real time. For example, the UDR may enable a 5G service provider to change or modify an assigned network slice QoS dynamically or in real time. The QoS changes may be applied to a new network slice and/or an existing network slice, and to data traffic generated by applications and users associated with the network slice. The UDR may enable a duration or a time interval for the QoS change to be specified before reverting to an original QoS. In some implementations, the UDR may enable a 5G mobile subscriber (e.g., a UE) to modify an assigned QoS for selected applications and for a specified duration. A user may utilize the UE to select applications for QoS modifications and to specify durations of the QoS modifications. The UDR may verify user credentials and device capabilities of the UE and may cause network slicing functions to map the selected applications either to a particular network slice (e.g., an eMBB slice or a URLLC slice). Thus, the UDR may conserve computing resources, networking resources, and/or other resources that would have otherwise been consumed by failing to enable a QoS of network slice to be modified after deployment, failing to provide adequate services via a network slice due being unable to modify the QoS of the network slice, providing a poor user experience for users of a network slice that would benefit from a QoS modification, and/or the like.

FIGS. 1A-1F are diagrams of an example 100 associated with providing network slice QoS modifications in real time. As shown in FIGS. 1A-1F, example 100 includes a UE 105, a base station 110, and a user device 120 associated with a core network 115. The core network 115 may include a UDR, an access and mobility management (AM)/UE policy control function (PCF), a session management (SM) PCF, an access and mobility management function (AMF), a session management function (SMF), and a user plane function (UPF). Further details of the UE 105, the base station 110, the core network 115, the user device 120, the UDR, the AM/UE PCF, the SM PCF, the AMF, the SMF, and the UPF are provided elsewhere herein.

As shown in FIG. 1A, and by reference number 125, the UDR may receive a request for data associated with network slices provided to a region or a network associated with the UE 105. For example, the UDR may be provisioned with a session management policy profile that identifies a subscriber (e.g., the UE 105) associated with one or more network slices. The UDR may be provisioned with a UE policy profile that identifies the subscriber as a subscriber to one or more network slices. The SM PCF may be configured with policy rules associated with policies that are based on a network slice identifier, a data network name, and/or the like. For example, an eMBB slice QoS may be associated with a 5G QoS identifier (5QI) "133" default flow and a session aggregated maximum bit rate (AMBR) 10/50 for uplink/downlink. The SM PCF may install network slice and date network name (DNN) policy rules for the UE 105 at a time a protocol data unit (PDU) session is created or any time after a PDU session is created based on a subscription. The AM/UE PCF may be configured with policy rules associated with policies that are executed based on the UE policy profile. The AM/UE PCF may push UE route selection policies (URSPs) to the UE 105 when the UE 105 registers or any time after registration based on a subscription.

In some implementations, the UDR may store the data associated with the network slices provided to the region or the network associated with the UE 105, including applications and UEs 105 mapped to the network slices. The user device 120 may enable a user (e.g., network operator) to modify or change network slice QoS in real time, from a level of QoS that may be granted to a particular network slice based on operator configured policies. This may enable the network operator to prioritize a public safety network slice carrying first responder mission critical application traffic during an emergency, to prioritize a network slice during network congestion, to prioritize a network slice in response to a customer service request, to prioritize a network slice upon determination of a need to change network operations, to prioritize a network slice to enforce data usage limits, to provide intelligent traffic control to deliver a best customer experience, and/or the like.

In some implementations, the user device 120 may provide a graphical user interface (GUI) that enables the network operator to view current assigned QoS of the network slices configured network wide or specific to a particular region. For example, the network operator may cause the user device 120 to generate the request for the data associated with network slices provided to the region or the network associated with the UE 105, and to provide the request to the UDR. The UDR may receive request for the data associated with network slices provided to the region or the network associated with the UE 105 from the user device 120. Alternatively, or additionally, the user device 120 may automatically generate the request for the data associated with network slices provided to the region or the network associated with the UE 105, and may provide the request to the UDR.

As further shown in FIG. 1A, and by reference number 130, the UDR may provide network slice data, QoS levels, and a policy lookup table based on the request. For example, based on the request, the UDR may identify the network slice data, the QoS levels for the network slices, and the policy lookup table in a data structure (e.g., a database, a table, a list, and/or the like) associated with the UDR. The UDR may provide the network slice data, the QoS levels of the network slices, and the policy lookup table to the user device 120 based on the request. The network slice data may include the session management policy profile that identifies the subscriber (e.g., the UE 105) associated with one or more network slices, the UE policy profile that identifies the subscriber as a subscriber to one or more network slices, and/or the like.

As further shown in FIG. 1A, the policy lookup table may include a policy definition field that defines policies for a network slice and a rules/actions field that defines actions to be taken for the policies defined in the policy definition field. For example, the policies may include a normal policy that requires no change in rules and/or actions, a first responder priority policy that prioritizes public safety network slice traffic and downgrades traffic carried by other network slices to best effort, a network congestion policy that prioritizes traffic from selected network slices and downgrades traffic carried by other network slices to best effort, a data throttling/de-prioritization policy that reduces an application (e.g., or traffic from a UE 105) associated with one or more network slices to best effort or a defined QoS value, and/or the like.

As shown in FIG. 1B, and by reference number 135, the UDR may receive priority data identifying a network slice for prioritization, a duration of the prioritization, and a policy for the prioritization. For example, the network operator may utilize the GUI provided by the user device 120 to select a network slice that needs to be modified (e.g., prioritized), a duration of the modification (e.g., prioritization), and a policy for the modification/prioritization (e.g., a first responder priority policy, a network congestion policy, a data throttling/de-prioritization policy, and/or the like). The network operator may cause the user device 120 to provide the priority data identifying the network slice for prioritization, the duration of the prioritization, and the policy for the prioritization to the UDR, and the UDR may receive the priority data from the user device 120. Alternatively, or additionally, the user device 120 may automatically generate the priority data identifying the network slice for prioritization, the duration of the prioritization, and the policy for the prioritization, and provide the priority data to the UDR.

As further shown in FIG. 1B, and by reference number 140, the UDR may create, based on the priority data, a QoS policy table with a QoS level for the network slice. For example, the UDR may create a QoS policy table that identifies the network slice prioritization, the duration of the prioritization, the policy for the prioritization, the QoS level for the network slice, and instructions for applying the policy and the QoS level for the network slice during the duration of the prioritization. The instructions for applying the policy for the prioritization and the QoS level for the network slice may be utilized by the UDR to instruct other network functions to utilize the QoS policy table. In some implementations, the UDR may update the network slice data based on the QoS policy table. For example, the UDR may utilize the QoS policy table to update the session management policy profile that identifies the subscriber (e.g., the UE 105) associated with the network slice, the UE policy profile that identifies the subscriber as a subscriber to the network slice, and/or the like.

As further shown in FIG. 1B, and by reference number 145, the UDR may acknowledge receipt of the priority data. For example, after creating the QoS policy table based on the priority data, the UDR may generate a message that acknowledges receipt of the priority data and that includes information indicating that QoS policy table with the QoS level will be implemented for the network slice. The UDR may provide the message to the user device 120, and the user device 120 may receive the message. The user device 120 may display the message to notify the network operator that the network slice prioritization for the UE 105 will be implemented.

Figure 1C:
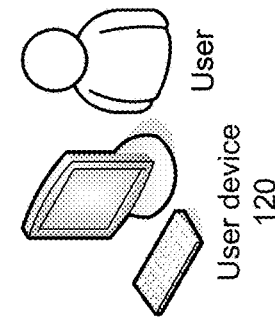
Figure 1C:
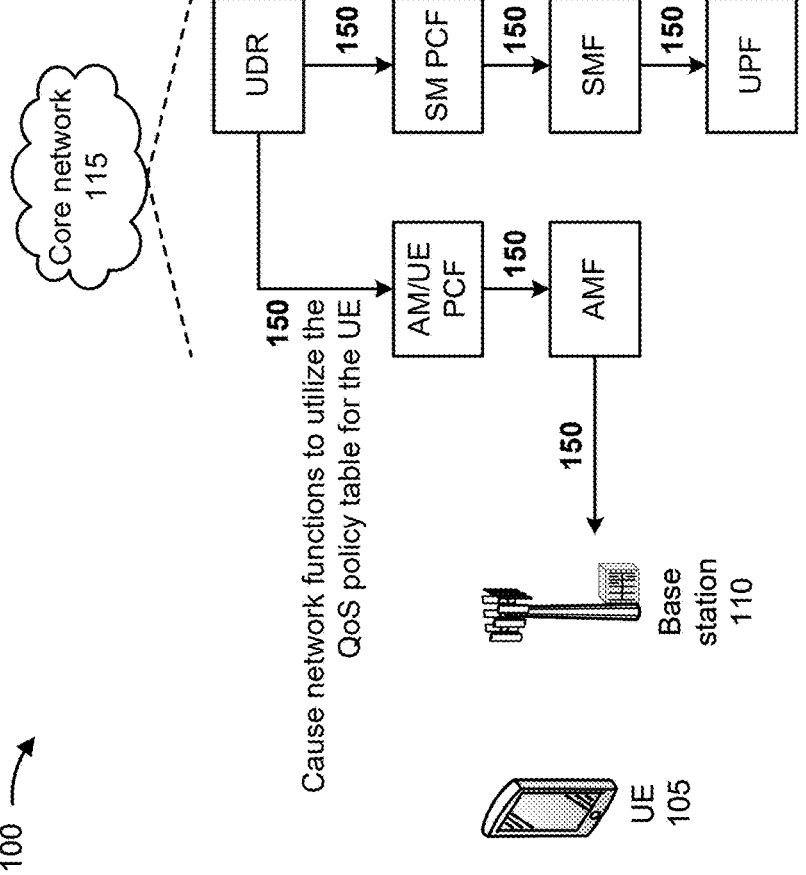

As shown in FIG. 1C, and by reference number 150, the UDR may cause network functions to utilize the QoS policy table for the UE 105. For example, the UDR may provide the instructions for applying the policy for the prioritization and the QoS level for the network slice to the AM/UE PCF and the SM PCF. The AM/UE PCF and the SM PCF may apply the QoS policy table (e.g., the policy for the prioritization and the QoS level) for the network slice based on the instructions. The AM/UE PCF may provide the instructions for applying the policy for the prioritization and the QoS level for the network slice to the AMF. The AMF may apply the QoS policy table (e.g., the policy for the prioritization and the QoS level) for the network slice based on the instructions. The AMF may provide the instructions for applying the policy for the prioritization and the QoS level for the network slice to the base station 110. The base station 110 may apply the QoS policy table (e.g., the policy for the prioritization and the QoS level) for the network slice based on the instructions. The SM PCF may provide the instructions for applying the policy for the prioritization and the QoS level for the network slice to the SMF. The SMF may apply the QoS policy table (e.g., the policy for the prioritization and the QoS level) for the network slice based on the instructions. The SMF may provide the instructions for applying the policy for the prioritization and the QoS level for the network slice to the UPF. The UPF may apply the QoS policy table (e.g., the policy for the prioritization and the QoS level) for the network slice based on the instructions.

In some implementations, the UDR may cause a service to be provided to the UE 105 via the network slice and based on the QoS policy table. The service may include a service that prioritizes the network slice for handling first responder traffic, a service that prioritizes traffic associated with the network slice in order to reduce network congestion, a service that throttles traffic associated with the network slice, and/or the like.

In some implementations, after the duration for the prioritization has expired, the UDR may cause the network functions to revert back to an original QoS value for the network slice (e.g., by instructing the network functions as described above). Alternatively, the network operator may instruct the UDR to cause the network functions to revert back to the original QoS value for the network slice prior to expiration of the duration for the prioritization.

Figure 1D:
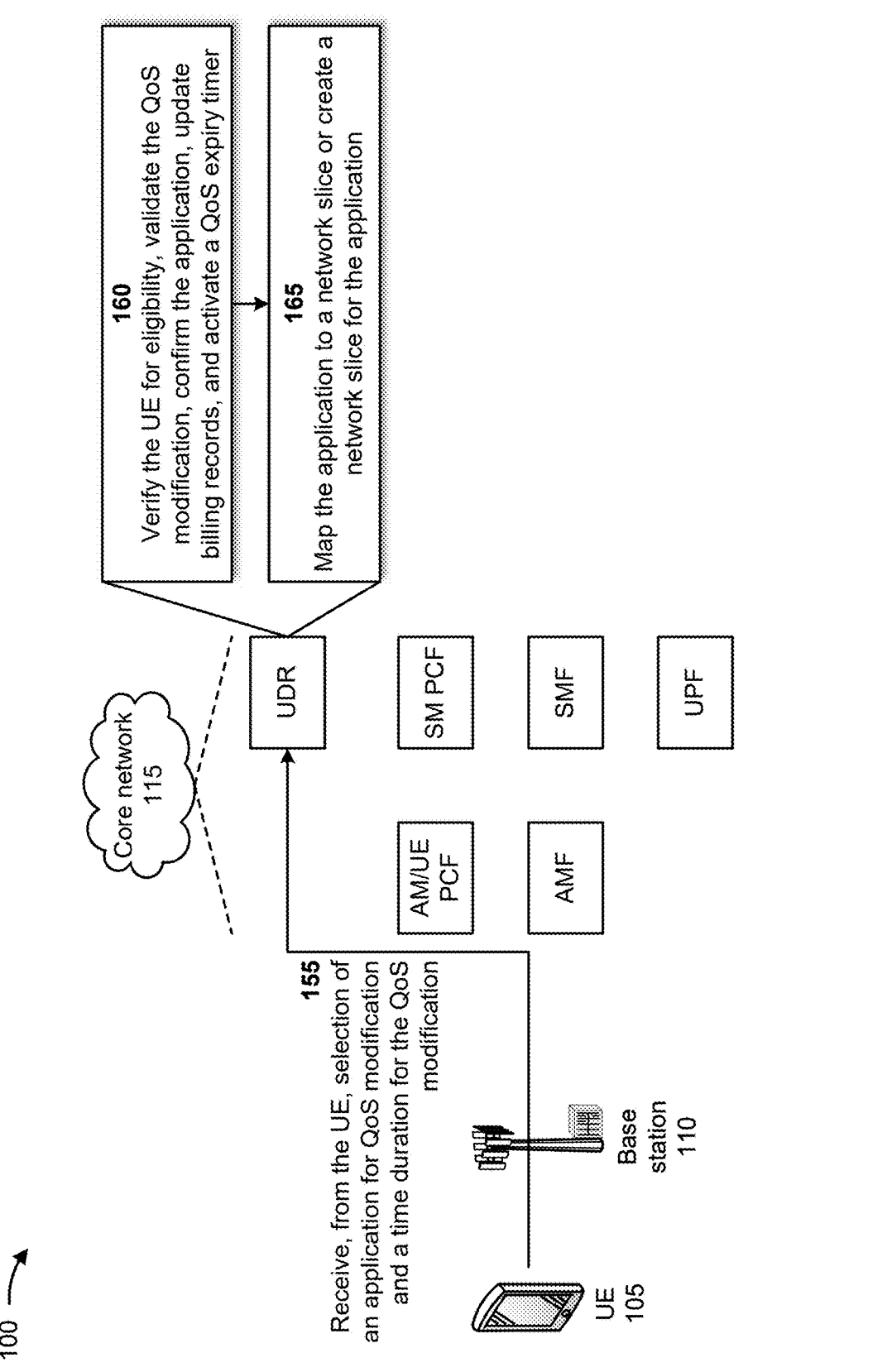

As shown in FIG. 1D, and by reference number 155, the UDR may receive, from the UE 105, selection of an application for QoS modification and a time duration for the QoS modification. For example, the UE 105 may provide a mobile application or a web portal for display to a user of the UE 105. The user may utilize the mobile application or the web portal to select an application for QoS modification and to specify a time duration for the QoS modification. The UE 105 may provide the selection of the application for QoS modification and the time duration for the QoS modification to the UDR, and the UDR may receive the selection of the application for QoS modification and the time duration for the QoS modification from the UE 105 (e.g., via the base station 110).

As further shown in FIG. 1D, and by reference number 160, the UDR may verify the UE 105 for eligibility, may validate the QoS modification, may confirm the application, may update billing records, and may activate a QoS expiry timer. For example, based on receiving the selection of the application for QoS modification and the time duration for the QoS modification, the UDR may determine whether the UE 105 (e.g., the subscriber) is eligible to modify the QoS for the application. In some implementations, the UDR may determine that the UE 105 is eligible for the QoS modification of the application when the UE 105 is registered for QoS modification with the UDR. Alternatively, the UDR may determine that the UE 105 is not eligible for the QoS modification of the application when the UE 105 is not registered for QoS modification with the UDR. In such implementations, the UDR may not modify the QoS for the application.

In some implementations, the UDR may validate the QoS modification for the application. For example, the UDR may determine whether current network conditions enable the QoS modification for the application. If the current network conditions enable the QoS modification for the application, the UDR may validate the QoS modification for the application. If the current network conditions do not enable the QoS modification for the application, the UDR may not validate the QoS modification for the application and may not modify the QoS for the application.

In some implementations, the UDR may confirm that the QoS for the application may be modified. For example, the UDR may confirm the application when the QoS for the application is capable of being modified. Alternatively, the UDR may not confirm the application when the QoS for the application is incapable of being modified. In such implementations, the UDR may not modify the QoS for the application.

In some implementations, if the UE 105 is verified for eligibility for the QoS modification, the QoS modification is validated for the application, and the application is confirmed, the UDR may update billing records for the UE 105 to account for the requested QoS modification for the application. In some implementations, if the UE 105 is verified for eligibility for the QoS modification, the QoS modification is validated for the application, and the application is confirmed, the UDR may activate a QoS expiry timer that specifies a time period for the QoS modification of the application.

As further shown in FIG. 1D, and by reference number 165, the UDR may map the application to a network slice or may create a network slice for the application. For example, if a network slice is available for the application, the UDR may map the application, with the QoS modification, to the available network slice. If a network slice is not available for the application, the UDR may create a network slice for the application and may map the application, with the QoS modification, to the created network slice. In some implementations, the network slice may include an eMBB slice, a URLLC slice, and/or the like.

Figure 1E:
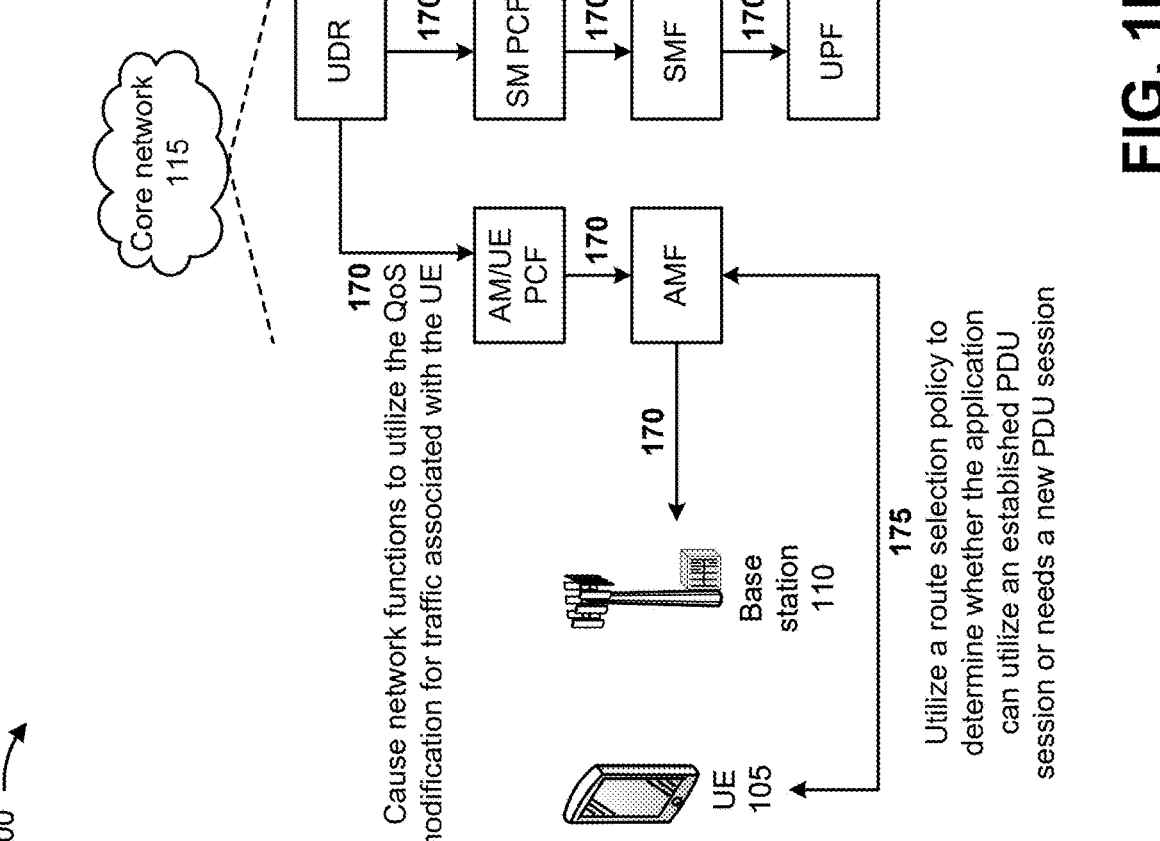

As shown in FIG. 1E, and by reference number 170, the UDR may cause network functions to utilize the QoS modification for traffic associated with the UE 105. For example, the UDR may generate instructions for utilizing the QoS modification for the application (e.g., the traffic associated with the UE 105), and may provide the instructions for utilizing the QoS modification for the application to the AM/UE PCF and the SM PCF. The AM/UE PCF and the SM PCF may apply the QoS modification for the application based on the instructions. The AM/UE PCF may provide the instructions for utilizing the QoS modification for the application to the AMF. The AMF may apply the QoS modification for the application based on the instructions. The AMF may provide the instructions for utilizing the QoS modification for the application to the base station 110. The base station 110 may apply the QoS modification for the application based on the instructions. The SM PCF may provide the instructions for utilizing the QoS modification for the application to the SMF. The SMF may apply the QoS modification for the application based on the instructions. The SMF may provide the instructions for utilizing the QoS modification for the application to the UPF. The UPF may apply the QoS modification for the application based on the instructions.

As further shown in FIG. 1E, and by reference number 175, the UE 105 may utilize a route selection policy to determine whether the application can utilize an established PDU session or needs a new PDU session. For example, the UE 105 may utilize a route selection policy (e.g., a URSP) to determine whether the application selected for QoS modification may utilize an established PDU session. If a PDU session is established for the application, the UE 105 may utilize the established PDU session for the application with the QoS modification. If a PDU session is not established for the application, the UE 105 may establish a new PDU session for the application and may utilize the new PDU session for the application with the QoS modification.

Figure 1F:
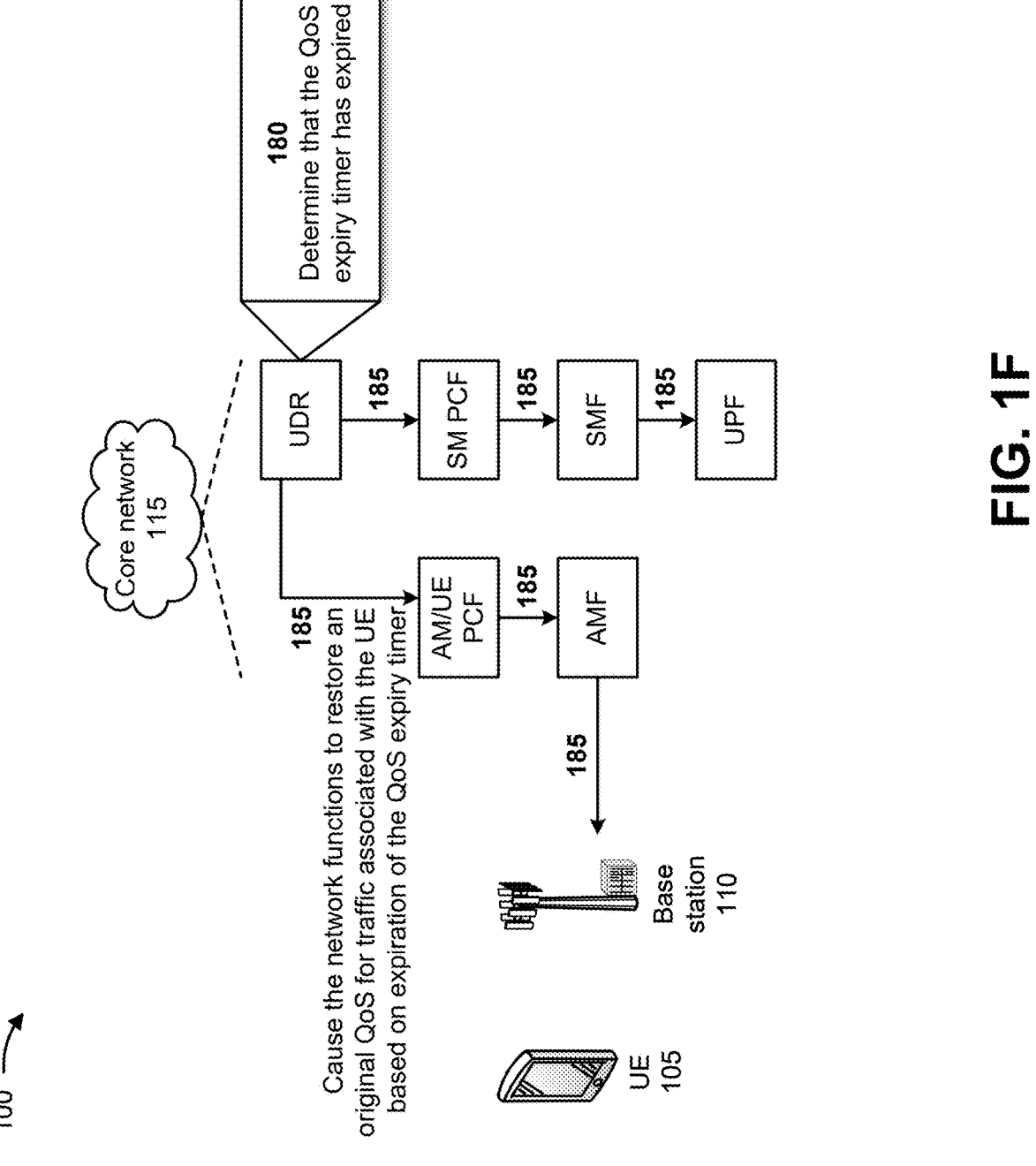

As shown in FIG. 1F, and by reference number 180, the UDR may determine that the QoS expiry timer has expired. For example, the UE 105 may utilize the application with the QoS modification for the time period specified by the QoS expiry timer. After the time period, the UDR may determine that the QoS expiry timer has expired and the UE 105 may be prevented from utilizing the application with the QoS modification.

As further shown in FIG. 1F, and by reference number 185, the UDR may cause the network functions to restore an original QoS for traffic associated with the UE 105 based on expiration of the QoS expiry timer. For example, after the UDR determines that the QoS expiry timer has expired, the UDR may generate instructions to restore the original QoS for the application (e.g., the traffic associated with the UE 105). The UDR may provide the instructions to the AM/UE PCF and the SM PCF, and the AM/UE PCF and the SM PCF may restore the original QoS for the application based on the instructions. The AM/UE PCF may provide the instructions to the AMF, and the AMF may restore the original QoS for the application based on the instructions. The AMF may provide the instructions to the base station 110, and the base station 110 may restore the original QoS for the application based on the instructions. The SM PCF may provide the instructions to the SMF, and the SMF may restore the original QoS for the application based on the instructions. The SMF may provide the instructions to the UPF, and the UPF may restore the original QoS for the application based on the instructions. In some implementations, the UDR may cause the network slice for the application to be removed based on expiration of the QoS expiry timer.

In this way, the UDR provides network slice QoS modifications in real time. For example, the UDR may enable a 5G service provider to change or modify an assigned network slice QoS dynamically or in real time. The QoS changes may be applied to a new network slice and/or an existing network slice and to data traffic generated by applications and users associated with the network slice. The UDR may enable a duration or a time interval for the QoS change to be specified before reverting to an original QoS. In some implementations, the UDR may enable a 5G mobile subscriber (e.g., the UE 105) to modify an assigned QoS for selected applications and for a specified duration. A user may utilize the UE 105 to select applications for QoS modifications and to specify durations of the QoS modifications. The UDR may verify user credentials and device capabilities of the UE 105 and may cause network slicing functions to map the selected applications either to a particular network slice (e.g., eMBB slice or a URLLC slice). Thus, the UDR may conserve computing resources, networking resources, and/or other resources that would have otherwise been consumed by failing to enable a QoS of network slice to be modified after deployment, failing to provide adequate services via a network slice due being unable to modify the QoS of the network slice, providing a poor user experience for users of a network slice that would benefit from a QoS modification, and/or the like.

As indicated above, FIGS. 1A-1F are provided as an example. Other examples may differ from what is described with regard to FIGS. 1A-1F. The number and arrangement of devices shown in FIGS. 1A-1F are provided as an example. In practice, there may be additional devices, fewer devices, different devices, or differently arranged devices than those shown in FIGS. 1A-1F. Furthermore, two or more devices shown in FIGS. 1A-1F may be implemented within a single device, or a single device shown in FIGS. 1A-1F may be implemented as multiple, distributed devices. Additionally, or alternatively, a set of devices (e.g., one or more devices) shown in FIGS. 1A-1F may perform one or more functions described as being performed by another set of devices shown in FIGS. 1A-1F.

Figure 2:
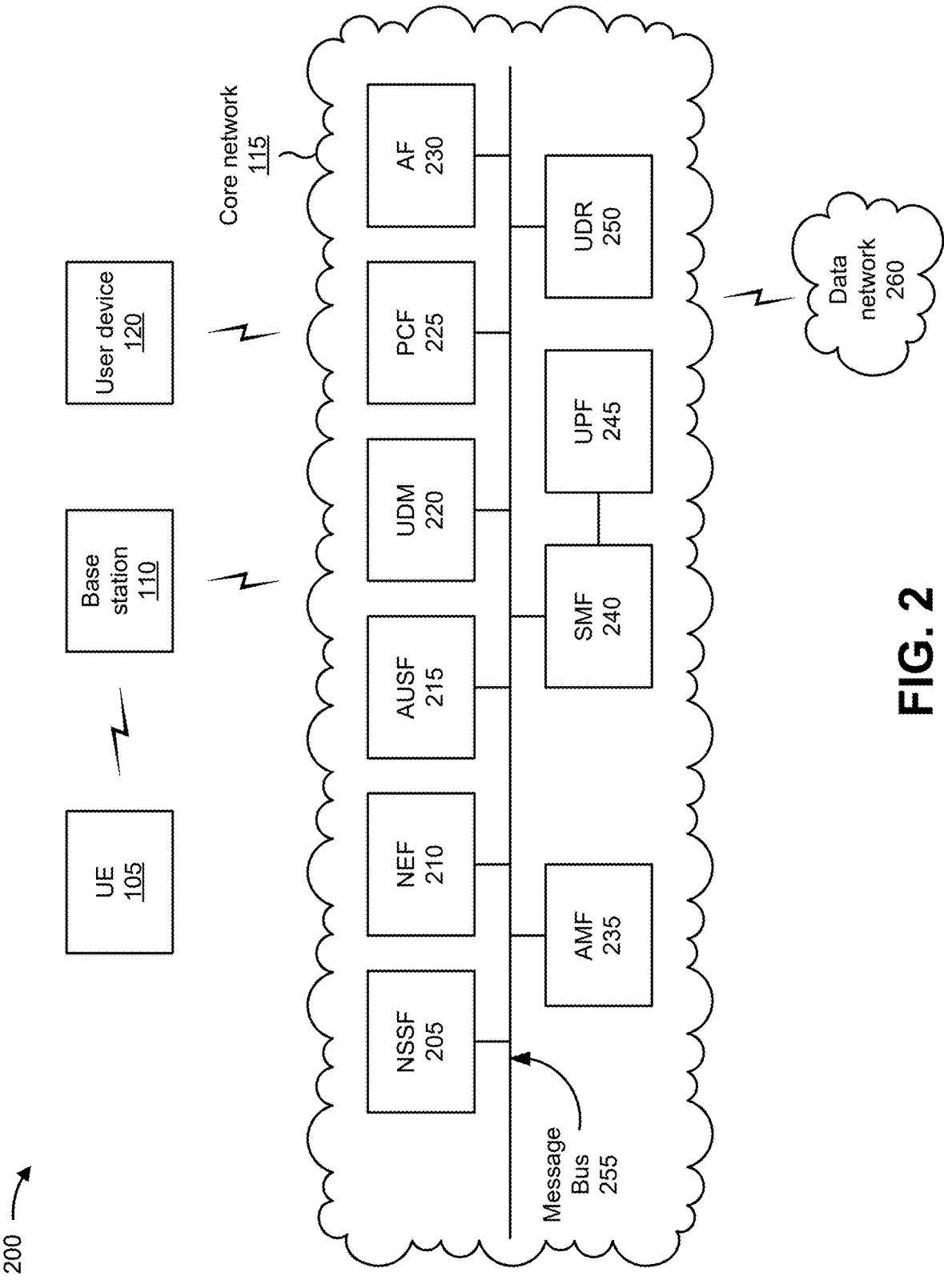
FIG. 2 is a diagram of an example environment in which systems and/or methods described herein may be implemented.

FIG. 2 is a diagram of an example environment 200 in which systems and/or methods described herein may be implemented. As shown in FIG. 2, example environment 200 may include the UE 105, the base station 110, the core network 115, the user device 120, and a data network 260. Devices and/or networks of example environment 200 may interconnect via wired connections, wireless connections, or a combination of wired and wireless connections.

The UE 105 includes one or more devices capable of receiving, generating, storing, processing, and/or providing information, such as information described herein. For example, the UE 105 can include a mobile phone (e.g., a smart phone or a radiotelephone), a laptop computer, a tablet computer, a desktop computer, a handheld computer, a gaming device, a wearable communication device (e.g., a smart watch or a pair of smart glasses), a mobile hotspot device, a fixed wireless access device, customer premises equipment, an autonomous vehicle, or a similar type of device.

The base station 110 may support, for example, a cellular radio access technology (RAT). The base station 110 may include one or more base stations (e.g., base transceiver stations, radio base stations, node Bs, eNodeBs (eNBs), gNodeBs (gNBs), base station subsystems, cellular sites, cellular towers, access points, transmit receive points (TRPs), radio access nodes, macrocell base stations, microcell base stations, picocell base stations, femtocell base stations, or similar types of devices) and other network entities that can support wireless communication for the UE 105. The base station 110 may transfer traffic between UE 105 (e.g., using a cellular RAT), one or more base stations (e.g., using a wireless interface or a backhaul interface, such as a wired backhaul interface), and/or the core network 115. The base station 110 may provide one or more cells that cover geographic areas.

In some implementations, the base station 110 may perform scheduling and/or resource management for the UE 105 covered by the base station 110 (e.g., the UE 105 covered by a cell provided by the base station 110). In some implementations, the base station 110 may be controlled or coordinated by a network controller, which may perform load balancing, network-level configuration, and/or other operations. The network controller may communicate with the base station 110 via a wireless or wireline backhaul. In some implementations, the base station 110 may include a network controller, a self-organizing network (SON) module or component, or a similar module or component. In other words, the base station 110 may perform network control, scheduling, and/or network management functions (e.g., for uplink, downlink, and/or sidelink communications of the UE 105 covered by the base station 110).

The user device 120 may include one or more devices capable of receiving, generating, storing, processing, and/or providing information, as described elsewhere herein. The user device 120 may include a communication device and/or a computing device. For example, the user device 120 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), a server device, a cloud-based device, a virtual device, or a similar type of device.

In some implementations, the core network 115 may include an example functional architecture in which systems and/or methods described herein may be implemented. For example, the core network 115 may include an example architecture of a 5G next generation (NG) core network included in a 5G wireless telecommunications system. While the example architecture of the core network 115 shown in FIG. 2 may be an example of a service-based architecture, in some implementations, the core network 115 may be implemented as a reference-point architecture and/or a 4G core network, among other examples.

As shown in FIG. 2, the core network 115 may include a number of functional elements. The functional elements may include, for example, a network slice selection function (NSSF) 205, a network exposure function (NEF) 210, an authentication server function (AUSF) 215, a unified data management (UDM) component 220, a PCF 225, an application function (AF) 230, an AMF 235, an SMF 240, a UPF 245, and a UDR 250. These functional elements may be communicatively connected via a message bus 255. Each of the functional elements shown in FIG. 2 is implemented on one or more devices associated with a wireless telecommunications system. In some implementations, one or more of the functional elements may be implemented on physical devices, such as an access point, a base station, and/or a gateway. In some implementations, one or more of the functional elements may be implemented on a computing device of a cloud computing environment.

The NSSF 205 includes one or more devices that select network slice instances for the UE 105. By providing network slicing, the NSSF 205 allows an operator to deploy multiple substantially independent end-to-end networks potentially with the same infrastructure. In some implementations, each slice may be customized for different services.

The NEF 210 includes one or more devices that support exposure of capabilities and/or events in the wireless telecommunications system to help other entities in the wireless telecommunications system discover network services.

The AUSF 215 includes one or more devices that act as an authentication server and support the process of authenticating the UE 105 in the wireless telecommunications system.

The UDM component 220 includes one or more devices that store user data and profiles in the wireless telecommunications system. The UDM component 220 may be used for fixed access and/or mobile access in the core network 115.

The PCF 225 includes one or more devices that provide a policy framework that incorporates network slicing, roaming, packet processing, and/or mobility management, among other examples.

The AF 230 includes one or more devices that support application influence on traffic routing, access to the NEF 210, and/or policy control, among other examples.

The AMF 235 includes one or more devices that act as a termination point for non-access stratum (NAS) signaling and/or mobility management, among other examples.

The SMF 240 includes one or more devices that support the establishment, modification, and release of communication sessions in the wireless telecommunications system. For example, the SMF 240 may configure traffic steering policies at the UPF 245 and/or may enforce user equipment Internet protocol (IP) address allocation and policies, among other examples.

The UPF 245 includes one or more devices that serve as an anchor point for intraRAT and/or interRAT mobility. The UPF 245 may apply rules to packets, such as rules pertaining to packet routing, traffic reporting, and/or handling user plane quality of service (QoS), among other examples.

The UDR 250 includes one or more devices that provide a converged repository utilized by 5G network functions to store data. For example, the UDR 250 may include a unified database for storing application, subscription, authentication, service authorization, policy data, session binding, application state information, and/or the like.

The message bus 255 represents a communication structure for communication among the functional elements. In other words, the message bus 255 may permit communication between two or more functional elements.

The data network 260 includes one or more wired and/or wireless data networks. For example, the data network 260 may include an IP Multimedia Subsystem (IMS), a public land mobile network (PLMN), a local area network (LAN), a wide area network (WAN), a metropolitan area network (MAN), a private network such as a corporate intranet, an ad hoc network, the Internet, a fiber optic-based network, a cloud computing network, a third party services network, an operator services network, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of the example environment 200 may perform one or more functions described as being performed by another set of devices of the example environment 200.

Figure 3:
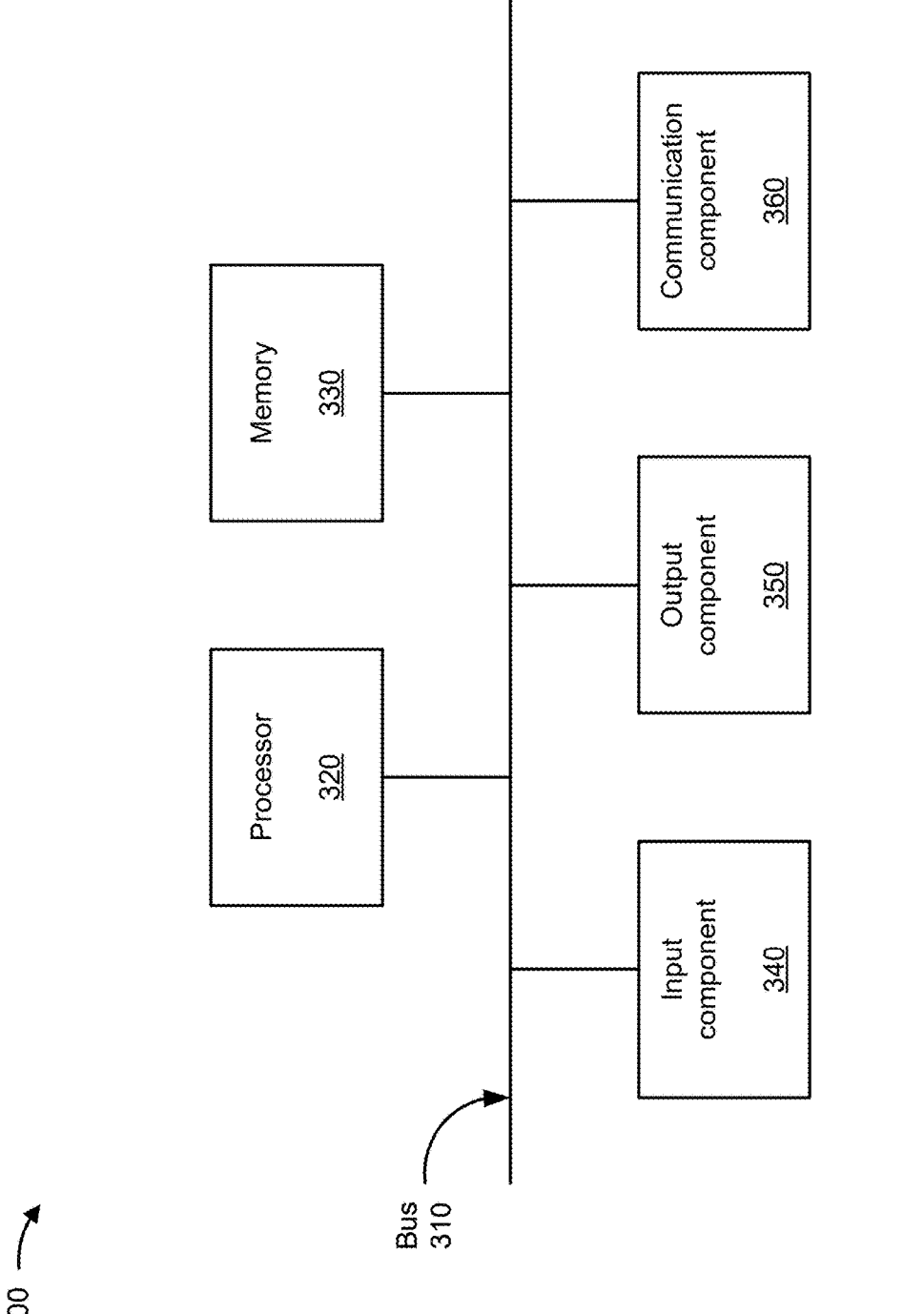
FIG. 3 is a diagram of example components of one or more devices of FIG. 2.

FIG. 3 is a diagram of example components of a device 300, which may correspond to the UE 105, the base station 110, the user device 120, the NSSF 205, the NEF 210, the AUSF 215, the UDM component 220, the PCF 225, the AF 230, the AMF 235, the SMF 240, the UPF 245, and/or the UDR 250. In some implementations, the UE 105, the base station 110, the user device 120, the NSSF 205, the NEF 210, the AUSF 215, the UDM component 220, the PCF 225, the AF 230, the AMF 235, the SMF 240, the UPF 245, and/or the UDR 250 may include one or more devices 300 and/or one or more components of the device 300. As shown in FIG. 3, the device 300 may include a bus 310, a processor 320, a memory 330, an input component 340, an output component 350, and a communication component 360.

The bus 310 includes one or more components that enable wired and/or wireless communication among the components of the device 300. The bus 310 may couple together two or more components of FIG. 3, such as via operative coupling, communicative coupling, electronic coupling, and/or electric coupling. The processor 320 includes a central processing unit, a graphics processing unit, a microprocessor, a controller, a microcontroller, a digital signal processor, a field-programmable gate array, an application-specific integrated circuit, and/or another type of processing component. The processor 320 is implemented in hardware, firmware, or a combination of hardware and software. In some implementations, the processor 320 includes one or more processors capable of being programmed to perform one or more operations or processes described elsewhere herein.

The memory 330 includes volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. The memory 330 stores information, instructions, and/or software (e.g., one or more software applications) related to the operation of the device 300. In some implementations, the memory 330 includes one or more memories that are coupled to one or more processors (e.g., the processor 320), such as via the bus 310.

The input component 340 enables the device 300 to receive input, such as user input and/or sensed input. For example, the input component 340 may include a touch screen, a keyboard, a keypad, a mouse, a button, a microphone, a switch, a sensor, a global positioning system sensor, an accelerometer, a gyroscope, and/or an actuator. The output component 350 enables the device 300 to provide output, such as via a display, a speaker, and/or a light-emitting diode. The communication component 360 enables the device 300 to communicate with other devices via a wired connection and/or a wireless connection. For example, the communication component 360 may include a receiver, a transmitter, a transceiver, a modem, a network interface card, and/or an antenna.

The device 300 may perform one or more operations or processes described herein. For example, a non-transitory computer-readable medium (e.g., the memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hard-wired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

FIG. 4 is a flowchart of an example process 400 for providing network slice QoS modifications in real time. In some implementations, one or more process blocks of FIG. 4 may be performed by a network device (e.g., the UDR 250). In some implementations, one or more process blocks of FIG. 4 may be performed by another device or a group of devices separate from or including the device, such as a UE (e.g., the UE 105) and/or a user device (e.g., the user device 120). Additionally, or alternatively, one or more process blocks of FIG. 4 may be performed by one or more components of the device 300, such as the processor 320, the memory 330, the input component 340, the output component 350, and/or the communication component 360.

As shown in FIG. 4, process 400 may include receiving, from a user device, a request for data associated with network slices provided to a region or a network (block 410). For example, the network device may receive, from a user device, a request for data associated with network slices provided to a region or a network, as described above.

As further shown in FIG. 4, process 400 may include providing, to the user device, network slice data, QoS levels, and a policy lookup table based on the request (block 420). For example, the network device may provide, to the user device, network slice data, QoS levels, and a policy lookup table based on the request, as described above.

As further shown in FIG. 4, process 400 may include receiving, from the user device, priority data identifying a network slice for prioritization, a duration of the prioritization, and a policy for the prioritization (block 430). For example, the network device may receive, from the user device, priority data identifying a network slice for prioritization, a duration of the prioritization, and a policy for the prioritization, as described above.

As further shown in FIG. 4, process 400 may include creating, based on the priority data, a QoS policy table that includes a QoS level for the network slice (block 440). For example, the network device may create, based on the priority data, a QoS policy table that includes a QoS level for the network slice, as described above.

As further shown in FIG. 4, process 400 may include causing network functions to utilize the QoS policy table for a UE (block 450). For example, the network device may cause network functions to utilize the QoS policy table for a UE, as described above. In some implementations, causing the network functions to utilize the QoS policy table for the UE includes causing the network functions to utilize the QoS level for the network slice and the UE. In some implementations, the network functions are configured to utilize the QoS policy table to modify a QoS of the network slice. In some implementations, the UE utilizes the network slice for one or more applications.

In some implementations, process 400 includes acknowledging receipt of the priority data from the user device. In some implementations, process 400 includes providing a service to the UE via the network slice and based on the QoS policy table. In some implementations, the service includes one or more of a service that prioritizes the network slice for handling first responder traffic, a service that prioritizes traffic associated with the network slice in order to reduce network congestion, or a service that throttles traffic associated with the network slice.

In some implementations, process 400 includes receiving, from a UE, selection of an application for QoS modification and a time duration for the QoS modification; verifying that the UE is eligible for the QoS modification; validating the QoS modification for the UE; activating a QoS expiry timer; mapping the application to a network slice; and causing network functions to utilize the QoS modification for traffic associated with the UE. In some implementations, process 400 includes creating the network slice for the application prior to mapping the application to the network slice.

In some implementations, process 400 includes determining that the QoS expiry timer has expired, and causing network functions to restore an original QoS for the traffic associated with the UE based on expiration of the QoS expiry timer. In some implementations, process 400 includes removing the network slice based on expiration of the QoS expiry timer. In some implementations, process 400 includes confirming that the application is eligible for the QoS modification, and updating billing records associated with the UE.

In some implementations, the UE is configured to utilize a route selection policy to determine whether the application can utilize an established PDU session or requires a new PDU session. In some implementations, the network slice is one of an eMBB slice or a URLLC slice.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
   receiving, by a unified data repository (UDR) and from a user device, a request for data associated with network slices provided to a region or a network;
   providing, by the UDR and to the user device, network slice data, quality of service (QoS) levels, and a policy lookup table based on the request;
   receiving, by the UDR, from the user device, and in response to providing the network slice data, the QOS levels, and the policy lookup table to the user device, priority data identifying a network slice for prioritization, a duration of the prioritization, and a policy for the prioritization;
   creating, by the UDR and based on the priority data, a QoS policy table that includes a QoS level for the network slice; and
   causing, by the UDR, network functions to utilize the QoS policy table for a user equipment.

2. The method of claim 1, further comprising:
   acknowledging receipt of the priority data from the user device.

3. The method of claim 1,
   wherein causing the network functions to utilize the QoS policy table for the user equipment comprises:
      causing the network functions to utilize the QoS level for the network slice and the user equipment.

4. The method of claim 1, further comprising:
   providing a service to the user equipment via the network slice and based on the QoS policy table.

5. The method of claim 4,
   wherein the service includes one or more of:
      a service that prioritizes the network slice for handling first responder traffic,
      a service that prioritizes traffic associated with the network slice in order to reduce network congestion, or
      a service that throttles traffic associated with the network slice.

6. The method of claim 1,
   wherein the network functions are configured to utilize the QoS policy table to modify a QoS of the network slice.

7. The method of claim 1,
  wherein the user equipment utilizes the network slice for one or more applications.

8. A non-transitory computer-readable medium storing a set of instructions, the set of instructions comprising:
  one or more instructions that, when executed by one or more processors of a unified data repository (UDR), cause the UDR to:
    receive, from a user device, a request for data associated with network slices provided to a region or a network;
    provide, to the user device, network slice data, quality of service (QoS) levels, and a policy lookup table based on the request;
    receive, from the user device and in response to providing the network slice data, the QOS levels, and the policy lookup table to the user device, priority data identifying a network slice for prioritization, a duration of the prioritization, and a policy for the prioritization;
    acknowledge receipt of the priority data from the user device;
    create, based on the priority data, a QoS policy table that includes a QoS level for the network slice; and
    cause network functions to utilize the QoS policy table for a user equipment.

9. The non-transitory computer-readable medium of claim 8, wherein the one or more instructions, that cause the UDR to cause the network functions to utilize the QoS policy table for the user equipment, cause the UDR to:
  cause the network functions to utilize the QoS level for the network slice and the user equipment.

10. The non-transitory computer-readable medium of claim 8, wherein the one or more instructions further cause the UDR to:
  provide a service to the user equipment via the network slice and based on the QoS policy table.

11. The non-transitory computer-readable medium of claim 10,
  wherein the service includes one or more of:
    a service that prioritizes the network slice for handling first responder traffic,
    a service that prioritizes traffic associated with the network slice in order to reduce network congestion, or
    a service that throttles traffic associated with the network slice.

12. The non-transitory computer-readable medium of claim 8, wherein the one or more instructions further cause the UDR to utilize the QoS policy table to modify a QoS of the network slice.

13. The non-transitory computer-readable medium of claim 8,
  wherein the user equipment utilizes the network slice for one or more applications.

14. A unified data repository (UDR), comprising:
  one or more processors configured to:
    receive from a user device, a request for data associated with network slices provided to a region or a network;
    provide, to the user device, network slice data, quality of service (QoS) levels, and a policy lookup table based on the request;
    receive, from the user device, in response to providing the network slice data, the QOS levels, and the policy lookup table to the user device, priority data identifying a network slice for prioritization, a duration of the prioritization, and a policy for the prioritization;
    create, based on the priority data, a QoS policy table that includes a QoS level for the network slice; and
    cause network functions to utilize the QoS policy table for a user equipment.

15. The UDR of claim 14, wherein the one or more processors are further configured to:
  acknowledge receipt of the priority data from the user device.

16. The UDR of claim 14, wherein the one or more processors, to cause the network functions to utilize the QoS policy table for the user equipment, are configured to:
  cause the network functions to utilize the QoS level for the network slice and the user equipment.

17. The UDR of claim 14, wherein the one or more processors are further configured to:
  provide a service to the user equipment via the network slice and based on the QoS policy table.

18. The UDR of claim 14, wherein the service includes one or more of:
  a service that prioritizes the network slice for handling first responder traffic,
  a service that prioritizes traffic associated with the network slice in order to reduce network congestion, or
  a service that throttles traffic associated with the network slice.

19. The UDR of claim 14, wherein the network functions are configured to utilize the QoS policy table to modify a QoS of the network slice.

20. The UDR of claim 14, wherein the user equipment utilizes the network slice for one or more applications.

* * * * *